United States Patent
Horiguchi

(10) Patent No.: US 9,085,201 B2
(45) Date of Patent: Jul. 21, 2015

(54) PNEUMATIC TIRE

(75) Inventor: Takuya Horiguchi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 971 days.

(21) Appl. No.: 13/241,364

(22) Filed: Sep. 23, 2011

(65) Prior Publication Data

US 2012/0085471 A1 Apr. 12, 2012

(30) Foreign Application Priority Data

Oct. 7, 2010 (JP) .................................. 2010-227768

(51) Int. Cl.
*B60C 11/03* (2006.01)
*B60C 11/00* (2006.01)

(52) U.S. Cl.
CPC ............ *B60C 11/0306* (2013.04); *B60C 11/005* (2013.01); *B60C 11/0304* (2013.04); *B60C 2011/0025* (2013.04); *B60C 2011/0369* (2013.04)

(58) Field of Classification Search
CPC ............ B60C 11/0008; B60C 11/0016; B60C 11/0025; B60C 11/0041; B60C 11/005; B60C 11/0058; B60C 11/006; B60C 11/0304; B60C 11/0306; B60C 11/0309; B60C 2011/0358; B60C 2011/0367; B60C 2011/0369; B60C 2011/0344; B60C 2011/0348; B60C 2011/0351; B60C 2011/0355

USPC .................. 152/209.8, 209.9, 209.25, 209.27, 152/209.5, 905
See application file for complete search history.

(56) References Cited

U.S. PATENT DOCUMENTS

| | | | |
|---|---|---|---|
| 5,343,914 A | 9/1994 | Wako | |
| 2003/0121580 A1* | 7/2003 | Bello et al. | ............... 152/209.25 |
| 2005/0121123 A1* | 6/2005 | Nakagawa | ................. 152/209.9 |

FOREIGN PATENT DOCUMENTS

JP 2003-326917 * 11/2003

* cited by examiner

*Primary Examiner* — Eric Hug
(74) *Attorney, Agent, or Firm* — Birch, Stewart, Kolasch & Birch, LLP

(57) ABSTRACT

A pneumatic tire is provided with a tread pattern of left-right asymmetry having an outboard tread edge and an inboard tread edge, and a cap tread rubber having a hardness of from 60 to 75 degrees. An outboard crown land zone defined between middle and outboard main grooves is provided with a circumferentially extending crown sub groove and a crown narrow groove and outboard crown lateral grooves so as to form one row of central crown blocks having an axial width W1, one row of outboard crown blocks having an axial width W2, and one circumferentially extending crown narrow rib having an axial width W3, wherein the axial widths satisfy W1>=W2>=W3.

9 Claims, 4 Drawing Sheets

PNEUMATIC TIRE

BACKGROUND OF THE INVENTION

The present invention relates to a pneumatic tire, more particularly to a tread structure for a summer tire capable of improving steering stability on dry roads and grip performance when used on icy or snow-packed roads.

In the situation that it is necessary to drive a FF car provided with summer tires on icy or snowy roads, it is often the case that tire chains are attached to only the front wheels, namely driven wheels. On the rear wheels, therefore, it is difficult to obtain necessary lateral grip, and the car is liable to skid or fishtail.

It is known in the tire art to use a relatively soft rubber compound as the tread rubber contacting with the ground in order to increase the grip performance of a snow tire during running on icy or snow-packed roads.

However, if such soft tread rubber compound is used in a summer tire, slumping deformation of tread blocks increases due to the lower rigidity of the tread rubber, and the steering stability during running on dry roads is greatly deteriorated.

SUMMARY OF THE INVENTION

It is therefore, an object of the present invention to provide a pneumatic tire in which, without sacrificing the steering stability during running on the dry roads as a summer tire, grip performance especially lateral grip when running on icy or snow-packed roads is improved.

According to the present invention, a pneumatic tire comprises a tread portion provided with a tread pattern of left-right asymmetry and having an outboard tread edge and an inboard tread edge between which a tread width is defined, a cap tread rubber disposed in the tread portion to define the tread surface, and having a hardness of from 60 to 75 degrees, the tread pattern comprising a plurality of circumferentially continuously extending main grooves including a middle main groove whose widthwise center line is located near and on the inboard tread edge side of the tire equator at a distance of from 2 to 10% of the tread width from the tire equator, and whose groove width is in a range of from 2 to 6 mm, and an outboard main groove whose widthwise center line is located on the outboard tread edge side of the tire equator at a distance of from 15 to 30% of the tread width from the tire equator, and whose groove width is more than that of the middle main groove, wherein an outboard crown land zone, which is defined between the middle main groove and the outboard main groove, is provided with a crown sub groove extending continuously in the tire circumferential direction, and positioned on the outboard tread edge side of the tire equator, and having a groove width less than that of the middle main groove, a crown narrow groove extending continuously in the tire circumferential direction, and positioned on the outboard tread edge side of the crown sub groove, and having a groove width less than that of the crown sub groove, and a plurality of outboard crown lateral grooves extending from the crown narrow groove to the middle main groove while inclining to one circumferential direction, whereby in the outboard crown land zone, there are a row of circumferentially arranged central crown blocks defined by the middle main groove, the crown sub groove and the outboard crown lateral grooves, and having an axial width $W1$, a row of circumferentially arranged outboard crown blocks defined by the crown sub groove, the crown narrow groove and the outboard crown lateral grooves, and having an axial width $W2$, and a circumferentially continuously extending crown narrow rib defined between the crown narrow groove and the outboard main groove, and having an axial width $W3$, wherein the axial width $W2$ is equal to or less than the axial width $W1$, and equal to or more than the axial width $W3$.

Therefore, the outboard crown land zone can increase groove edges existing in a region from the tire equator to the outboard tread edge where the ground pressure increases during cornering, and lateral grip on icy or snow-packed roads is increased to improve ice/snow performance of the tire without chain.

Further, owing to the relationship $W1 \geq W2 \geq W3$, in the outboard crown land zone, the distribution density of the circumferential groove edges gradually increases from the tire equator toward the outboard tread edge. Thus, the lateral grip is greatly increased, and ice/snow performance can be effectively improved.

Furthermore, owing to the hardness of the cap tread rubber, the slumping deformation of the blocks is controlled, and the deterioration of the steering stability during running on dry roads can be prevented.

In the present invention, it is optional but preferred that the outboard main groove has a groove depth $D1$, the crown narrow groove has a groove depth $D2$, and the crown sub groove has a groove depth $D3$, and the groove depth $D2$ is less than the groove depth $D1$ and more than the groove depth $D3$;

that the outboard crown lateral grooves each have a groove depth gradually decreasing from the middle main groove to the crown narrow groove;

that the angle of the outboard crown lateral groove with respect to the tire circumferential direction is in a range of from 30 to 70 degrees;

that the central crown blocks, the outboard crown blocks and the crown narrow rib are provided with sipes inclined oppositely to the outboard crown lateral grooves; and that the cap tread rubber has a loss tangent in a range of from 0.05 to 0.15.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The term "groove width" means the width of a groove measured perpendicularly to the longitudinal direction of the groove.

The term "axial width" means the width of the object concerned measured in parallel with the tire axial direction.

The tread width (TW) is the axial distance between the inboard and outboard tread edges ($2i$ and $2o$) measured in the normally inflated unloaded condition of the tire.

The tread edges ($2i$ and $2o$) are the axial outermost edges of the ground contacting patch (camber angle=0) in the normally inflated loaded condition.

The "hardness" of rubber means the JIS-A hardness measured at 23 deg.C. with a type-A durometer according to Japanese Industrial Standard K6253.

The loss tangent (tan δ) of rubber is measured according to Japanese Industrial standard JIS-K6394 by the use of a viscoelastic spectrometer manufactured by Iwamoto Seisakusyo under the following conditions.
 initial strain: 10%
 amplitude: +−2%
 frequency: 10 Hz
 strain mode: tensile
 temperature: 70 deg.C.

DESCRIPTION OF THE PREFERRED EMBODIMENTS

Embodiments of the present invention will now be described in detail in conjunction with the accompanying drawings.

According to the present invention, pneumatic tire 1 comprises a tread portion 2, a pair of sidewall portions, a pair of bead portions each with a bead core therein, a carcass extending between the bead portions through the tread portion 2 and sidewall portions, and a tread reinforcing layer disposed radially outside the carcass in the tread portion 2 as usual.

In this embodiment, the tire 1 is constructed as so called summer tire for passenger cars.

Figure 1:
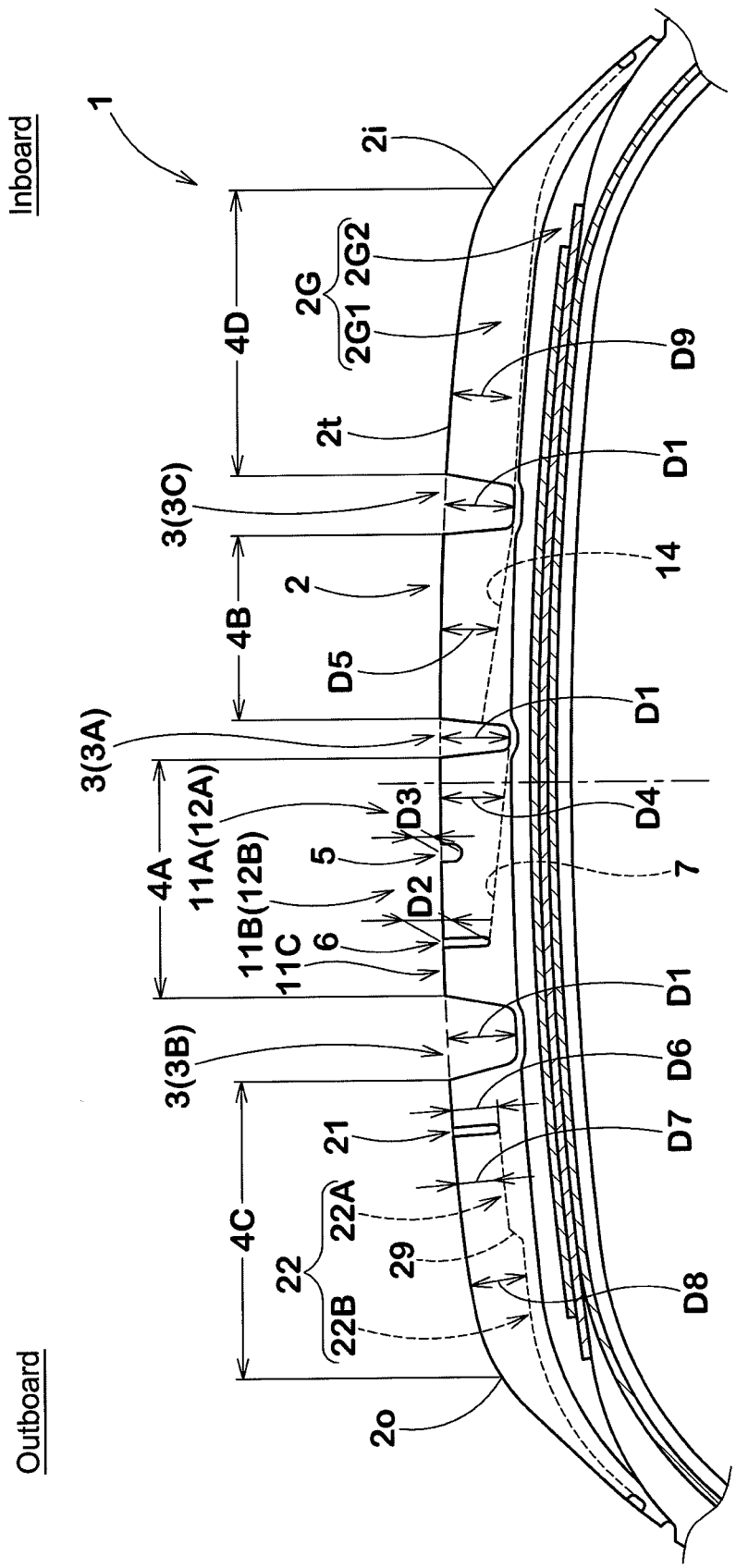
FIG. 1 is a cross sectional view of the tread portion of a pneumatic tire according to an embodiment of the present invention, taken along line A-A in FIG. 2.

As shown in FIG. 1, the tread rubber 2G disposed in the tread portion 2, and the tread rubber 2G is made up of a cap tread rubber 2G1 defining the tread surface $2t$ of the tread portion 2, and a base tread rubber 2G2 disposed radially inside a cap tread rubber 2G1.

The cap tread rubber 2G1 has a hardness of from 60 to 75 degrees and a loss tangent of from 0.05 to 0.15 in order to improve the steering stability on dry roads and fuel consumption performance.

Figure 2:
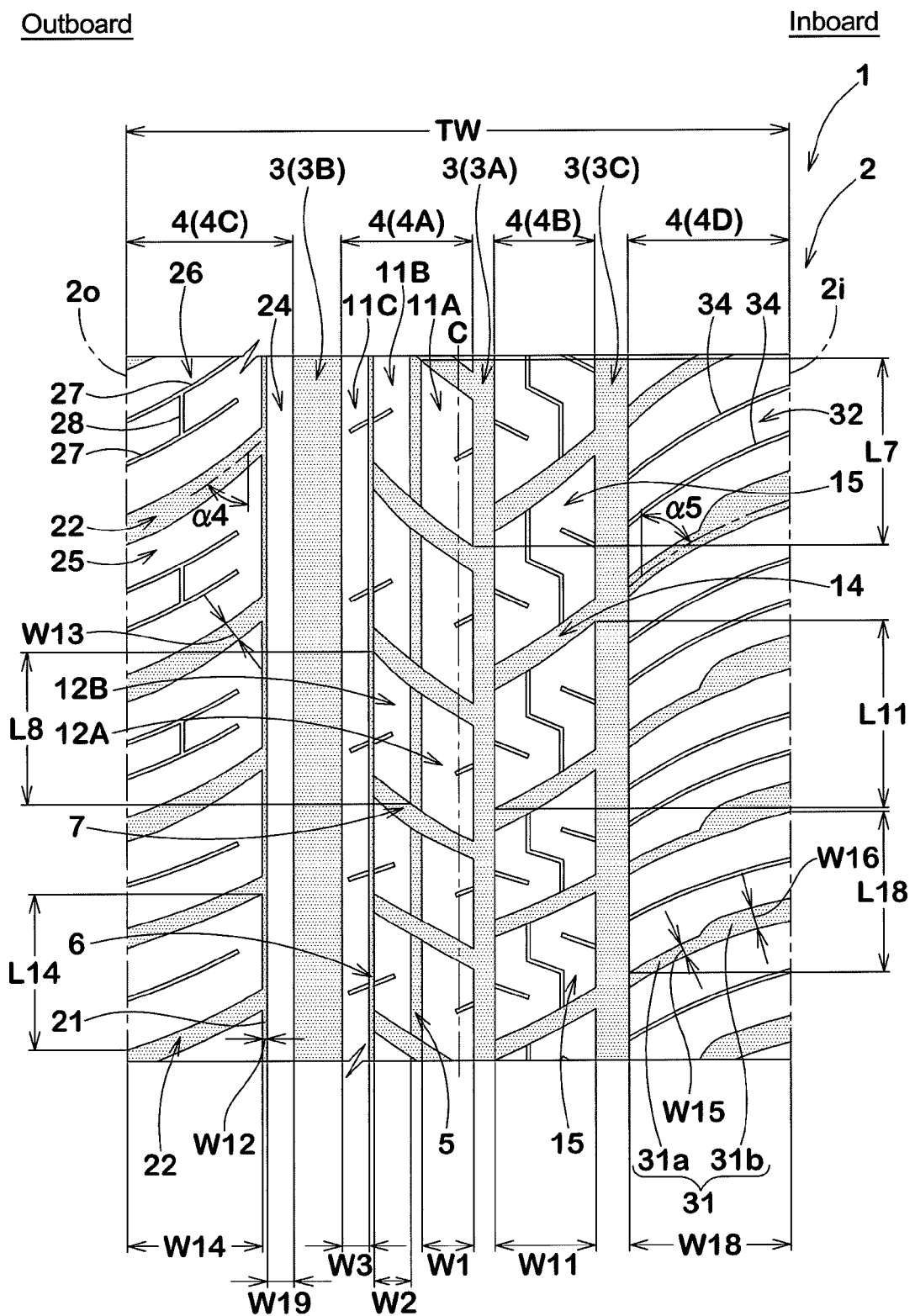
FIG. 2 and FIG. 3 are developed partial views of the tread portion.

As shown in FIG. 2, the tread portion 2 is provided with a tread pattern of left-right asymmetry (asymmetry about the tire equator C), and the mounting position of the tire is specified. Specifically, the tread portion 2 has an outboard tread edge $2o$ to be positioned away from the center of the vehicle body and an inboard tread edge $2i$ to be positioned close to the center of the vehicle body.

The asymmetric tread pattern comprises a plurality of circumferentially continuously extending main grooves 3. The main grooves 3 in this example include a middle main groove 3A whose widthwise center line E1 is positioned near but on the inboard tread edge side of the tire equator C, an outboard main groove 3B whose widthwise center line E2 is positioned on the outboard tread edge side of the tire equator C, and an inboard main groove 3C whose widthwise center line E3 is positioned on the inboard tread edge side of the middle main groove 3A.

The main grooves 3A, 3B and 3C are straight grooves each having a groove depth D1 in a range of about 6 to 9 mm. Such main grooves 3A, 3B and 3C provide circumferentially extending groove edges, and the lateral grip performance on icy or snow-packed roads can be improved. Further, in comparison with zigzag grooves, the drainage is enhanced and wet performance can be improved.

In comparison with the main grooves 3B and 3C, the middle main groove 3A is narrow in width, and the groove width W4 of the middle main groove 3A is set in a range of from 2 to 6 mm.

The distance L1 from the tire equator C to the widthwise center line E1 of the middle main groove 3A is set in a range of from 2 to 10% of the tread width TW.

In a region near the tire equator C where the ground pressure becomes relatively large during straight running, such middle main groove 3A can smoothly lead the water on the road surface toward the tire circumferential direction. Further, owing to the relatively narrow middle main groove 3A, an increased ground contacting area which helps to improve the straight running stability and steering stability on dry roads can be secured.

Preferably, the groove width W5 of the outboard main groove 3B is set in a range of from 8 to 15 mm.

The distance L2 from the tire equator C to the widthwise center line E2 of the outboard main groove 3B is set in a range of from 15 to 30% of the tread width TW.

Such outboard main groove 3B effectively increases the drainage performance during cornering where the ground pressure is relatively increased on the outboard tread edge side.

In comparison with the outboard main groove 3B, the inboard main groove 3C is narrow in width, and the groove width W6 of the inboard main groove 3C is set in a range of from 5 to 8 mm.

The distance L3 from the tire equator C to the widthwise center line E3 of the inboard main groove 3C is preferably set in a range of from 15 to 30% of the tread width TW.

Such inboard main groove 3C can increase the drainage performance of the tire positioned close to the cornering center where the ground pressure thereof becomes relatively increased on the inboard tread edge side.

By the middle main groove 3A, outboard main groove 3B and inboard main groove 3C, the tread portion 2 is axially divided into four annular zones or land zones 4 which are:

an outboard crown land zone 4A defined by the middle main groove 3A and outboard main groove 3B, an inboard crown land zone 4B defined by the middle main groove 3A and inboard main groove 3C, an outboard shoulder land zone 4C defined by the outboard main groove 3B and outboard tread edge 2o, and an inboard shoulder land zone 4D defined by the inboard main groove 3C and inboard tread edge 2i.

The outboard crown land zone 4A is provided with a crown sub groove 5 extending continuously in the tire circumferential direction, and positioned on the outboard tread edge side of the tire equator C, a crown narrow groove 6 extending continuously in the tire circumferential direction, and positioned on the outboard tread edge side of the crown sub groove 5, and a plurality of outboard crown lateral grooves 7 each extending from the crown narrow groove 6 to the middle main groove 3A, while inclining to one circumferential direction.

Therefore, in the outboard crown land zone 4A, there are formed a row 11A of circumferentially arranged central crown blocks 12A defined by the middle main groove 3A, the crown sub groove 5 and the outboard crown lateral grooves 7, a row 11B of circumferentially arranged outboard crown blocks 12B defined by the crown sub groove 5, the crown narrow groove 6 and the outboard crown lateral grooves 7, and a circumferentially continuously extending crown narrow rib 11C defined between the crown narrow groove 6 and the outboard main groove 3B.

The crown sub groove 5 is a straight groove parallel with the tire circumferential direction.

The distance L4 from the tire equator C to the widthwise center line E4 of the crown sub groove 5 is set in a range of from 3 to 10% of the tread width TW.

The crown sub groove 5 has a groove width W7 of from about 1 to 3 mm, and a groove depth D3 of from about 1 to 4 mm.

The groove width W7 and groove depth D3 are less than those of the middle main groove 3A.

The crown narrow groove 6 is a straight groove parallel with the tire circumferential direction.

The distance L5 from the tire equator C to the widthwise center line E5 of the crown narrow groove 6 is set in a range of from 10 to 15% of the tread width TW.

The groove width W8 of the crown narrow groove 6 is set in a range of from about 0.5 to 2 mm, and less than that of the crown sub groove 5.

The groove depth D2 of the crown narrow groove 6 is set in a range of from about 4 to 6 mm, and more than that of the crown sub groove 5.

In the course from the crown narrow groove 6 to the middle main groove 3A, the angle α1 of the outboard crown lateral groove 7 with respect to the tire circumferential direction is gradually increased, and the groove width W9 of the outboard crown lateral groove 7 is maintained substantially constant.

such outboard crown lateral groove 7 can lead the water on the road surface toward the axial middle main groove 3A, and can improve the drainage performance.

owing to the inclination of the outboard crown lateral grooves 7, the circumferential component of the groove edges increases to improve the lateral grip performance.

In order to surely derive these functions, the groove width W9 of the outboard crown lateral groove 7 is preferably set in a range of from about 2 to 6 mm, and the groove depth D4 thereof is preferably set in a range of about 4 to 8 mm.

As shown in FIG. 2, the top shape of the central crown block 12A is generally a parallelogram in which the circumferential length L7 is more than the axial width W1. Preferably, the axial width W1 of the central crown blocks 12A is set in a range of from about 5 to 10% of the tread width TW. The circumferential length L7 of the central crown blocks 12A is set in a range of from about 150 to 500% of the axial width W1. Such central crown blocks 12A increase the circumferential component of the block edges to improve the lateral grip performance.

Similarly, the top shape of the outboard crown block 12B is generally a parallelogram in which the circumferential length L8 is more than the axial width W2. Preferably, the axial width W2 of the outboard crown blocks 12B is set in a range of from about 5 to 10% of the tread width TW, and the circumferential length L8 thereof is set in a range of from about 150 to 500% of the axial width W2.

The crown narrow rib 11C extends continuously in the tire circumferential direction, while maintaining a substantially constant axial width W3.

Such crown narrow rib 11C can greatly increase the circumferential component of the edges.

Preferably, the axial width W3 of the crown narrow rib 11C is set in a range of from about 3 to 8% of the tread width TW.

The axial width W1 of the central crown block 12A, the axial width W2 of the outboard crown block 12B and the axial width W3 of the crown narrow rib 11C satisfy the following relationship:

$$W1 >= W2 >= W3.$$

In the outboard crown land zone 4A, the circumferential edge component capable of increasing the lateral grip is increased by the central crown blocks, outboard crown blocks and crown narrow rib, and grip can be effectively increased in a region from the tire equator C to the outboard tread edge where the ground pressure becomes increased during cornering.

Therefore, the outboard crown land zone 4A can increase the grip on snow-packed roads, and the improved ice/snow performance can be obtained without tire chains.

Further, in the outboard crown land zone 4A, since the width W1 of the central crown blocks 12A, the width W2 of the outboard crown blocks 12B and the width W3 of the crown narrow rib 11C satisfy the above-mentioned relationship, the distribution density of the circumferential groove edges is gradually increased from the tire equator C toward the outboard tread edge where the ground pressure gradually increase during cornering, therefore, the lateral grip can be greatly increased and ice/snow performance can be effectively improved.

Furthermore, in the tire 1 according to this embodiment, even though the rubber hardness of the cap tread rubber 2G1 is 60 to 75 degrees, and the loss tangent is 0.05 to 0.15, the grip can be increased as explained above, therefore, the steering stability on dry roads and fuel consumption performance can be improved, while maintaining ice/snow performance.

If the groove width W4 of the middle main groove 3A is less than 2 mm, then there is a possibility that drainage performance decrease. If the groove width W4 exceeds 6 mm, then there is a possibility that the straight running stability and steering stability on dry roads are deteriorated.

Preferably, the groove width W4 is set in a range of not less than 3 mm, more preferably not less than 3.5 mm, but not more than 5.5 mm, more preferably not more than 5 mm.

For the similarly reasons, the groove width W5 of the outboard main groove 3B is preferably set in a range of not less than 8.5 mm, more preferably not less than 9 mm, but not more than 14 mm, more preferably not more than 13 mm.

Further, the groove width W6 of the inboard main groove 3C is preferably set in a range of not less than 5.5 mm, more preferably not less than 6 mm, but not more than 7.5 mm, more preferably not more than 7 mm.

If the distance L1 of the middle main groove 3A is less than 2% of the tread width TW, then there is a possibility that the edge component can not be increased over a wide range. If the distance L1 exceeds 10% of the tread width TW, then there is a possibility that the drainage performance and ice/snow performance is not fully improved when the tire is positioned away from the cornering center where the ground pressure thereof is relatively increased on the outboard tread edge side. Therefore, the distance L1 is preferably set in a range of not less than 2.5%, more preferably not less than 3%, but not more than 9%, more preferably not more than 8% of the tread width TW.

For the similar reasons, the distance L2 of the outboard main groove 3B is preferably set in a range of not less than 17%, more preferably not less than 19%, but not more than 28%, more preferably not more than 26% of the tread width TW.

Further, the distance L3 of the inboard main groove 3C is preferably set in a range of not less than 17%, more preferably not less than 19%, but not more than 28%, more preferably not more than 26% of the tread width TW.

If the rubber hardness of the cap tread rubber 2G1 is less than 60 degrees, then the rigidity of the cap tread rubber 2G1 becomes low and there is a possibility that the steering stability on the dry road surfaces can not be fully improved. If the rubber hardness exceeds 75 degrees, then the rigidity of the cap tread rubber 2G1 becomes excessively high, and the contact between the tread surface 2t and the road surface decreases. Thus, there is a possibility that the lateral grip can not be effectively increased.

Therefore, the rubber hardness is preferably set in a range of not less than 61 degrees, more preferably not less than 62 degrees, but preferably not more than 73 degrees, more preferably not more than 71 degrees.

If the loss tangent of the cap tread rubber 2G1 is less than 0.05, then there is a possibility that the lateral grip can not be effectively increased. If the loss tangent exceeds 0.15, then there is a possibility that the fuel consumption performance deteriorates. Therefore, the loss tangent is preferably set in a range of from not less than 0.06, more preferably not less than 0.07, but not more than 0.14, more preferably not more than 0.13.

It is preferable that the groove depth D1 of the outboard main groove 3B, the groove depth D2 of the crown narrow groove 6, the groove depth D3 of the and crown sub groove 5 satisfy the following relationship:

$$D1 > D2 > D3.$$

Thereby, in the outboard crown land zone 4A, in cooperation with the above-mentioned relationship of the widths W1, W2 and W3, the deflection (flexibility) becomes gradually increased from the central crown blocks' row 11A toward the crown narrow rib 11C. This increases the contact between the tread surface of the crown narrow rib 11C and the road surface, and the lateral grip on icy or snow-packed roads can be improved.

It is preferable that the groove depth D4 of the outboard crown lateral groove 7 gradually decreases from the middle main groove 3A to the crown narrow groove 6 within the above-mentioned range. Thereby, in the outboard crown land zone 4A, the rigidity is increased on the outboard tread edge side where the ground pressure becomes increased during cornering, therefore, the steering stability on dry roads can be improved. Further, in the outboard crown land zone 4A, the groove volume is increased in a region near the tire equator C where the ground pressure becomes increased during straight running, therefore, it is possible to smoothly lead the water on the road surface.

The angle $\alpha 1$ of the outboard crown lateral groove 7 is preferably set to be not less than 35 degrees, more preferably not less than 40 degrees.

If the angle $\alpha 1$ is too small, the water on the road surface can not be effectively led in the axial direction, and there is a possibility that the drainage performance deteriorates. If the angle $\alpha 1$ is too large, the circumferential edge component decreases, and there is a possibility that the lateral grip can not be effectively increased.

From this standpoint, the angle $\alpha 1$ is preferably not more than 70 degrees, more preferably not more than 65 degrees.

The central crown blocks 12A, outboard crown blocks 12B and crown narrow rib 11C are preferably provided with sipes 13 which are, with respect to the tire circumferential direction, inclined to the opposite direction to the outboard crown lateral grooves 7.

In this embodiment, the sipes 13 include an inboard sipe 13a whose one end is opened at the middle main groove 3A and the other end terminates within the central crown block 12A, a middle sipes 13b whose one end is opened at the crown narrow groove 6 and the other end terminates within the outboard crown block 12B, and an outboard sipes 13c whose one end is opened at the crown narrow groove 6 and the other end terminates within the crown narrow rib 11C.

On both sides of the crown narrow groove 6, the open ends of the middle sipes 13b are aligned with the open ends of the outboard sipes 13c.

By such sipes 13a, 13b and 13c, the edge component, which can increase the lateral grip, can be provided in the outboard crown land zone 4A. Further, as the sipes are inclined oppositely to the outboard crown lateral grooves 7, an edge component can be provided in every direction.

In order to effectively derive such functions, the sipes 13a, 13b and 13c are formed to have a width of about 0.5 to 1.5 mm, and a depth of about 1 to 5 mm.

Preferably, the axial length L9 is set in a range of from about 2 to 5% of the tread width TW.

Further, the sipes 13a, 13b and 13c are preferably inclined at angles $\alpha 2$ of 45 to 70 degrees with respect to the tire circumferential direction.

The inboard crown land zone 4B is provided with a plurality of inboard crown lateral grooves 14 extending from the inboard main groove 3C to the middle main groove 3A, while inclining to one circumferential direction.

Thereby, in the inboard crown land zone 4B, there are formed a row of circumferentially arranged inboard crown blocks 15 defined by the inboard main groove 3C, the middle main groove 3A and the inboard crown lateral grooves 14.

Figure 3:
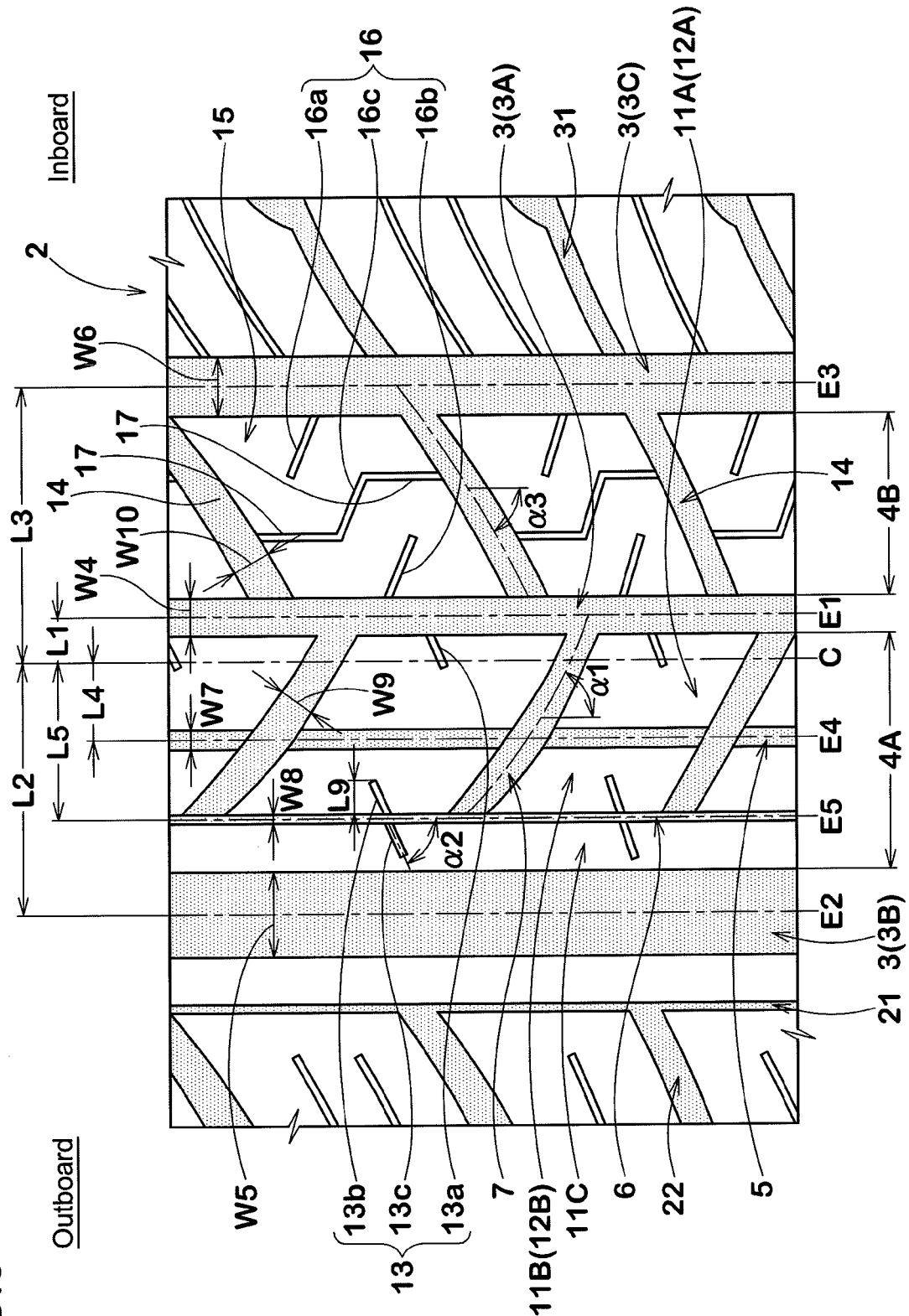

As shown in FIG. 3, from the inboard main groove 3C to the middle main groove 3A, the angle $\alpha 3$ of the inboard crown lateral groove 14 with respect to the tire circumferential direction is gradually increased, and the groove width W10 of the inboard crown lateral groove 14 is kept at a substantially constant value.

It is preferable that the groove width W10 and groove depth D5 of the inboard crown lateral groove 14 are set in the same ranges for the outboard crown lateral groove 7.

Such inboard crown lateral groove 14 can improve the drainage performance in the same manner as the outboard crown lateral grooves 7.

As shown in FIG. 2, the top shape of the inboard crown block 15 is generally a parallelogram in which the axial width W11 is more than the circumferential length L11.

Preferably, the axial width W11 of the inboard crown blocks 15 is set in a range of about 10 to 20% of the tread width TW, and the circumferential length L11 thereof is set in a range of about 100 to 300% of the axial width W11.

Such inboard crown blocks 15 can increase the axial edge component and the circumferential edge component in a well balance manner.

In such inboard crown land zone 4B, also by the inboard crown blocks 15, the edge component capable of increasing the lateral grip can be provided.

Therefore, the inboard crown land zone 4B can improve ice/snow performance of the tire positioned close to the cornering center where the ground pressure becomes gradually increased from the tire equator C toward the inboard tread edge.

It is preferable that, as shown in FIG. 1, the groove depth D5 of the inboard crown lateral groove 14 is gradually decreased from the inboard main groove 3C to the middle main groove 3A. Thereby, the rigidity of the inboard crown blocks 15 is increased, and the steering stability on dry roads can be improved.

It is preferable that, as shown in FIG. 3, the inboard crown blocks 15 are provided with sipes 16 inclined oppositely to the inboard crown lateral grooves 14.

In this embodiment, each of the inboard crown blocks 15 is provided with three parallel oblique sipes 16 which are an inboard oblique sipe 16a whose one end is opened at the inboard main groove 3C and the other end terminates within the inboard crown block 15, an outboard oblique sipe 16b whose one end is opened at the middle main groove 3A and the other end terminates within the inboard crown block 15, and a middle oblique sipe 16c therebetween having both ends located within the inboard crown block 15.

In this case, it is preferable that each block 15 is further provided with two sipes 17 extending in the tire circumferential direction respectively from the two ends of the middle oblique sipe 16c to the adjacent inboard crown lateral grooves 14 to open thereat.

Such oblique sipes 16a, 16b and 16c also provide the edge component capable of increasing the lateral grip.

Further, since the sipes are inclined oppositely to the inboard crown lateral groove 14, the sipes can provide an edge component in every direction.

The circumferential sipes 17 provide a circumferential edge component and further increase the contact between the tread surface of the inboard crown blocks 15 and the road surface, Thus, the lateral grip is further improved.

The outboard shoulder land zone 4C is provided with a shoulder narrow groove 21 extending continuously in the tire circumferential direction, and a plurality of outboard shoulder lateral grooves 22 extending from the shoulder narrow groove 21 to the outboard tread edge 2o. Thereby, in the outboard shoulder land zone 4C, there are formed a circumferentially continuously extending shoulder narrow rib 24 defined between the outboard main groove 3B and the shoulder narrow groove 21, and a row 26 of circumferentially arranged outboard shoulder blocks 25 defined by the shoulder narrow groove 21, the outboard tread edge 2o and the outboard shoulder lateral grooves 22.

In this embodiment, the shoulder narrow groove 21 is a straight groove, and the groove width W12 and groove depth D6 thereof are set in the same ranges as those for the crown narrow grooves 6.

From the shoulder narrow groove 21 to the outboard tread edge 2o, the angle α4 of the outboard shoulder lateral groove 22 with respect to the tire circumferential direction is gradually increased, and the groove width W13 of the outboard shoulder lateral groove 22 is gradually increased.

Such outboard shoulder lateral grooves 22 can smoothly lead the water on the road surface toward the outboard tread edge 2o, therefore, the drainage performance can be improved.

Preferably, the angle α4 of the outboard shoulder lateral groove 22 is set in the same range as that for the inboard crown lateral grooves 14, and the groove width W13 thereof is set in the substantially same ranges as that for the outboard crown lateral grooves 7 or that for the inboard crown lateral grooves 14.

The shoulder narrow rib 24 extends straight, while maintaining the axial width W19 of a substantially constant value. Such shoulder narrow rib 24 also greatly increase the circumferential edge component.

Preferably, the width W19 is set in a range of from about 3 to 8% of the tread width TW.

The top shape of the outboard shoulder block 25 is generally a parallelogram. The axial width W14 is set in a range of from about 10 to 30% of the tread width TW, and the circumferential length L14 is set in a range of from about 80 to 250% of the width W14. Preferably, the circumferential length L14 is more than the axial width W14.

Such outboard shoulder blocks 25 can be increased in the axial rigidity.

Owing to the shoulder narrow rib 24 and outboard shoulder blocks 25, the outboard shoulder land zone 4C can provide the edge component capable of increasing the lateral grip, and ice/snow performance can be improved.

As shown in FIG. 1, it is preferable that the outboard shoulder lateral groove 22 is provided with a shallow part 22A of which groove depth D7 is substantially equal to that of the shoulder narrow groove 21 and which extends from the shoulder narrow groove 21, and a deep part 22B which extends from the shallow part 22A toward the outboard tread edge 2o through a step difference 22C while maintaining a groove depth D8 along the almost entire length thereof which depth D8 is substantially equal to that of the outboard main groove 3B.

In such shallow groove part 22A, the rigidity of the outboard shoulder blocks 25 can be secured near the shoulder narrow groove 21, therefore, the slumping deformation of the blocks can be prevented, and the decrease in the steering stability on dry roads can be controlled.

It is preferable that, as shown in FIG. 2, the outboard shoulder blocks 25 are provided with oblique sipes 27 whose one end is opened at the outboard tread edge 2o and the other end terminates within the outboard shoulder block 25.

The oblique sipes 27 extend or incline in the substantially same direction as the outboard shoulder lateral grooves 22.

Further, it is preferable that the outboard shoulder blocks 25 are provided with sipes 28 extending in the tire circumferential direction and having two ends opened at the oblique sipes 27. Such oblique sipes 27 and circumferential direction sipes 28 increase the edge component and helps to improve ice/snow performance.

The inboard shoulder land zone 4D is provided with a plurality of inboard shoulder lateral grooves 31 extending from the inboard main groove 3C to the inboard tread edge 2i, while inclining to one circumferential direction.

Thereby, in the inboard shoulder land zone 4D, there are formed a row of circumferentially arranged inboard shoulder blocks 32 defined by the inboard main groove 3C, the inboard tread edge 2i and the inboard shoulder lateral grooves 31.

The inboard shoulder lateral grooves 31 include a narrow part 31a extending from the inboard main groove 3C toward the inboard tread edge 2i, and a wide part 31b being wider than the narrow part 31a and extending from the narrow part 31a to the inboard tread edge 2i.

On both sides of the inboard main groove 3C, the ends of the inboard shoulder lateral grooves 31 are aligned with the ends of the inboard crown lateral grooves 14.

From the inboard main groove 3C toward the inboard tread edge 2i, the angle α5 of the inboard shoulder lateral groove 31 with respect to the tire circumferential direction is gradually increased.

Such inboard shoulder lateral grooves 31 lead the water on the road surface toward the inboard tread edge 2i and improve the drainage performance.

Preferably, the angle α5 of the inboard shoulder lateral groove 31 is set in the substantially same range as that for the angle α3 of the inboard crown lateral groove 14, and the groove depth D9 thereof is set in the substantially same range as that for the inboard main groove 3C.

Further, it is preferable that the groove width W15 of the narrow part 31a is set in a range of from about 2 to 6 mm, and the groove width W16 of the wide part 31b is set in a range of from about 4 to 8 mm.

The top shape of the inboard shoulder block 32 is generally a parallelogram. The axial width W18 is set in a range of from about 15 to 35% of the tread width TW, and the circumferential length L18 is set in a range of from about 80 to 200% of the axial width W18. Preferably, the circumferential length L18 is more than the axial width W18.

Such inboard shoulder blocks 32 can be increased in the axial rigidity. And owing to the inboard shoulder blocks 32, the inboard shoulder land zone 4D provides the edge component capable of increasing the lateral grip, and can improve ice/snow performance.

Further, it is preferable that the outboard shoulder blocks 25 are each provided with one or two oblique sipes 34 whose one end is opened at the inboard main groove 3C and the other end is opened at the inboard tread edge 2i, and the oblique sipes 34 are inclined or extend in the substantially same direction as the outboard shoulder lateral grooves 22. Such oblique sipes 34 also helps to improve ice/snow performance.

Comparison Tests

Test tires of size 175/65R14 (rim size: 14×5.0) for passenger cars having the basic structure shown in FIG. 1 were prepared and tested for the following performances.

Except for the specifications shown in Table 1, the test tires had the same specifications.

The specifications common to all of the tires are as follows.
Tread width TW: 135 mm
Inboard main groove:
  groove width W6: 6.5 mm
  distance L3: 30 mm (22% of TW)

Sipes:
  width: 1 mm
  depth: 3 mm
  axial length L9: 4 mm (3% of TW)
  angle α2: 60 degrees
Inboard crown lateral groove:
  groove width W10: 4 mm
  groove depth D7: 4 mm
  angle α3: 60 degrees
Inboard crown blocks:
  width W11: 20 mm (15% of Tw)
  length L11: 30 to 45 mm (150 to 225% of wil)
Shoulder narrow groove:
  groove width W12: 1 mm
  groove depth D6: 5 mm
Outboard shoulder lateral groove:
  angle α4: 40 degrees
  groove width W13: 4 mm
  shallow part depth D7: 4 mm
  deep part depth D8: 6 mm
Shoulder narrow rib:
  width W19: 5 mm (3.7% of TW)
Outboard shoulder blocks:
  width W14: 28 mm (20.7% of TW)
  length L14: 30 to 45 mm (107 to 160% of W14)
Inboard shoulder lateral groove:
  angle α5: 50 degrees
  groove depth D9: 7 mm
  narrow part width W15: 3 mm
  wide part width W16: 5 mm
Inboard shoulder blocks:
  width W18: 30 mm (22% of TW)
  length L18: 30 to 45 mm (100 to 150% of W18)

<Steering Stability Test>

Running a Japanese 1500 cc FF passenger car provided on four wheels with test tires (tire pressure 220 kPa) on a dry asphalt road in a tire test course, the test driver evaluated the steering stability into three ranks based on steering response, stiffness and grip during cornering. The results are shown in Table 1, wherein the higher the rank number, the better the steering stability on the dry roads.

<Ice/Snow Performance (Lateral Grip) Test>

The above-mentioned FF car provided on only the front wheels with steel chains was run on a snow-packed road of the tire test course, and the behavior of the rear wheels when steered to the right and left during running at 30 km/h, was evaluated by the test driver into three ranks.

The results are shown in Table 1, wherein the higher the rank number, the better the ice/snow performance.

<Rolling Resistance Test>

Using a rolling resistance tester, the test tire was measured for the rolling resistance under the following conditions:
  running speed 80 km/h
  tire pressure 220 kPa
  tire load 35 kN The results are indicated in Table 1 in three ranks wherein the higher the rank number, the better the rolling resistance.

<Drainage Performance (Wet Cornering) Test>

The above-mentioned car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in table 1 in three ranks wherein the higher the rank number, the better the drainage performance.

TABLE 1

Figure 4:
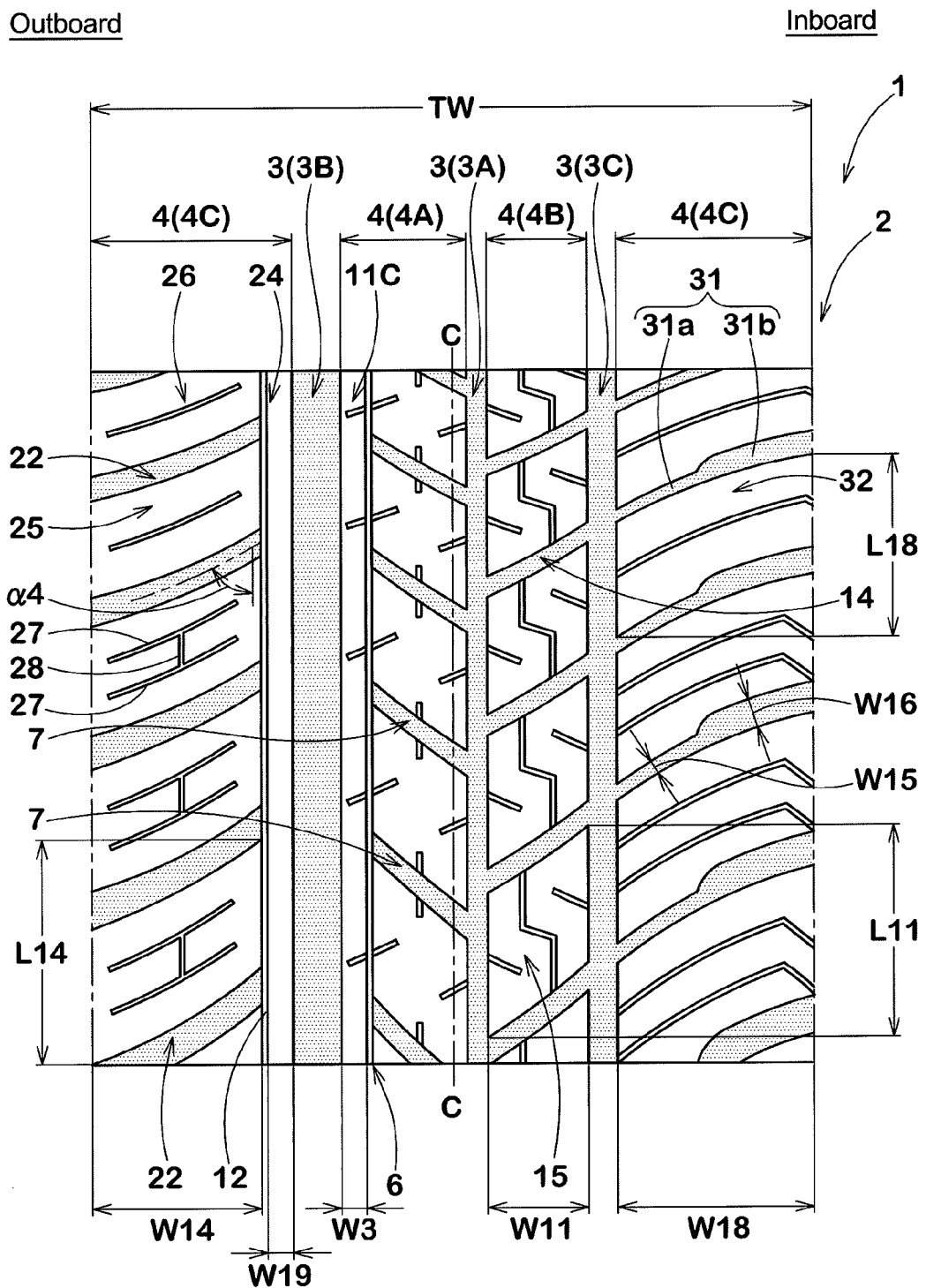
FIG. 4 is a developed partial view of the tread portion of a comparative example tire.

| | Tire | | | | | |
|---|---|---|---|---|---|---|
| | Ref. 1 | Ref. 2 | Ref. 3 | Ref. 4 | Ref. 5 | Ref. 6 |
| Tread pattern | FIG. 4 | FIG. 4 | FIG. 2 | FIG. 4 | FIG. 2 | FIG. 2 |
| Cap tread rubber hardness (deg.) | 55 | 65 | 65 | 65 | 78 | 65 |
| Cap tread rubber loss tangent | 0.1 | 0.1 | 0.1 | 0.2 | 0.1 | 0.1 |
| Middle main groove width W4 (mm) | 4 | 4 | 4 | 4 | 4 | 4 |
| Middle main groove distance L1 (mm) | 5 | 5 | 5 | 5 | 5 | 5 |
| L1/TW (%) | 4 | 4 | 4 | 4 | 4 | 4 |
| Outboard main groove width W5 (mm) | 10 | 10 | 10 | 10 | 10 | 10 |
| Outboard main groove depth D1 (mm) | 8 | 8 | 8 | 8 | 8 | 8 |
| Outboard main groove distance L2 (mm) | 30 | 30 | 30 | 30 | 30 | 30 |
| L2/TW (%) | 22 | 22 | 22 | 22 | 22 | 22 |
| Crown sub groove width W7 (mm) | — | — | 3 | — | 3 | 3 |
| Crown sub groove depth D3 (mm) | — | — | 2 | — | 2 | 2 |
| Crown sub groove distance L4 (mm) | — | — | 0 | — | 7 | 0 |
| L4/TW (%) | — | — | 0 | — | 5 | 0 |
| Crown narrow groove width W8 (mm) | 1 | 1 | 1 | 1 | 1 | 1 |
| Crown narrow groove depth D2 (mm) | 3 | 3 | 6 | 3 | 3 | 3 |
| Crown narrow groove distance L5 (mm) | 20 | 20 | 20 | 20 | 20 | 20 |
| L5/TW (%) | 15 | 15 | 15 | 15 | 15 | 15 |
| Outboard crown lateral groove width W9 (mm) | 3 | 3 | 3 | 3 | 3 | 3 |
| Depth D4 gradually decreased? | yes | yes | yes | yes | yes | yes |
| Range of groove depth D4 (mm) | 3 to 7 | 3 to 7 | 3 to 7 | 3 to 7 | 3 to 7 | 3 to 7 |
| Outboard crown lateral groove angle α1 (deg.) | 60 | 60 | 60 | 60 | 60 | 60 |
| Central crown block width W1 (mm) | — | — | 10 | — | 10 | 10 |
| W1/TW (%) | — | — | 7 | — | 7 | 7 |
| Central crown block length L7 (mm) | — | — | 20 to 35 | — | 20 to 35 | 20 to 35 |
| L7/W1 (%) | — | — | 200 to 350 | — | 200 to 350 | 200 to 350 |
| Outboard crown block width W2 (mm) | — | — | 9 | — | 9 | 9 |
| W2/TW (%) | — | — | 7 | — | 7 | 7 |
| Outboard crown block length L8 (mm) | — | — | 25 to 40 | — | 25 to 40 | 25 to 40 |
| L8/W2 (%) | — | — | 278 to 444 | — | 278 to 444 | 278 to 444 |
| Crown narrow rib width W3 (mm) | 5 | 5 | 5 | 5 | 5 | 5 |
| W3/TW (%) | 4 | 4 | 4 | 4 | 4 | 4 |
| Dry steering stability | 1 | 2 | 1 | 2 | 3 | 2 |
| Ice/snow performance | 3 | 1 | 1 | 2 | 1 | 1.5 |
| Rolling resistance | 3 | 3 | 3 | 1 | 3 | 3 |
| Drainage performance | 3 | 3 | 3 | 3 | 3 | 3 |

| | Tire | | | | |
|---|---|---|---|---|---|
| | Ex. 1 | Ex. 2 | Ex. 3 | Ex. 4 | Ex. 5 |
| Tread pattern | FIG. 2 | FIG. 2 | FIG. 2 | FIG. 2 | FIG. 2 |
| Cap tread rubber hardness (deg.) | 65 | 72 | 65 | 65 | 65 |
| Cap tread rubber loss tangent | 0.1 | 0.1 | 0.05 | 0.1 | 0.1 |
| Middle main groove width W4 (mm) | 4 | 4 | 4 | 2 | 6 |
| Middle main groove distance L1 (mm) | 5 | 5 | 5 | 5 | 5 |
| L1/TW (%) | 4 | 4 | 4 | 4 | 4 |
| Outboard main groove width W5 (mm) | 10 | 10 | 10 | 10 | 10 |
| Outboard main groove depth D1 (mm) | 8 | 8 | 8 | 8 | 8 |
| Outboard main groove distance L2 (mm) | 30 | 30 | 30 | 30 | 30 |
| L2/TW (%) | 22 | 22 | 22 | 22 | 22 |
| Crown sub groove width W7 (mm) | 3 | 3 | 3 | 3 | 3 |
| Crown sub groove depth D3 (mm) | 2 | 2 | 2 | 2 | 2 |
| Crown sub groove distance L4 (mm) | 7 | 7 | 7 | 7 | 7 |
| L4/TW (%) | 5 | 5 | 5 | 5 | 5 |
| Crown narrow groove width W8 (mm) | 1 | 1 | 1 | 1 | 1 |
| Crown narrow groove depth D2 (mm) | 3 | 3 | 3 | 3 | 3 |
| Crown narrow groove distance L5 (mm) | 20 | 20 | 20 | 20 | 20 |
| L5/TW (%) | 15 | 15 | 15 | 15 | 15 |
| Outboard crown lateral groove width W9 (mm) | 3 | 3 | 3 | 3 | 3 |
| Depth D4 gradually decreased? | yes | yes | yes | yes | yes |
| Range of groove depth D4 (mm) | 3 to 7 | 3 to 7 | 3 to 7 | 3 to 7 | 3 to 7 |
| Outboard crown lateral groove angle α1 (deg.) | 60 | 60 | 60 | 60 | 60 |
| Central crown block width W1 (mm) | 10 | 10 | 10 | 10 | 10 |
| W1/TW (%) | 7 | 7 | 7 | 7 | 7 |
| Central crown block length L7 (mm) | 20 to 35 | 20 to 35 | 20 to 35 | 20 to 35 | 20 to 35 |
| L7/W1 (%) | 200 to 350 | 200 to 350 | 200 to 350 | 200 to 350 | 200 to 350 |
| Outboard crown block width W2 (mm) | 9 | 9 | 9 | 9 | 9 |
| W2/TW (%) | 7 | 7 | 7 | 7 | 7 |
| Outboard crown block length L8 (mm) | 25 to 40 | 25 to 40 | 25 to 40 | 25 to 40 | 25 to 40 |
| L8/W2 (%) | 278 to 444 | 278 to 444 | 278 to 444 | 278 to 444 | 278 to 444 |
| Crown narrow rib width W3 (mm) | 5 | 5 | 5 | 5 | 5 |
| W3/TW (%) | 4 | 4 | 4 | 4 | 4 |
| Dry steering stability | 2 | 3 | 1.5 | 3 | 1.5 |
| Ice/snow performance | 3 | 2 | 2 | 3 | 3 |

TABLE 1-continued

| | | | | | |
|---|---|---|---|---|---|
| Rolling resistance | 3 | 3 | 3 | 3 | 3 |
| Drainage performance | 3 | 3 | 2 | 2 | 3 |

| | Tire | | | | |
|---|---|---|---|---|---|
| | Ex. 6 | Ex. 7 | Ex. 8 | Ex. 9 | Ex. 10 |
| Tread pattern | FIG. 2 | FIG. 2 | FIG. 2 | FIG. 2 | FIG. 2 |
| Cap tread rubber hardness (deg.) | 65 | 65 | 65 | 65 | 65 |
| Cap tread rubber loss tangent | 0.1 | 0.1 | 0.1 | 0.1 | 0.1 |
| Middle main groove width W4 (mm) | 4 | 4 | 4 | 4 | 4 |
| Middle main groove distance L1 (mm) | 13 | 5 | 5 | 5 | 5 |
| L1/TW (%) | 10 | 4 | 4 | 4 | 4 |
| Outboard main groove width W5 (mm) | 10 | 8 | 15 | 10 | 10 |
| Outboard main groove depth D1 (mm) | 8 | 8 | 8 | 8 | 8 |
| Outboard main groove distance L2 (mm) | 30 | 30 | 30 | 20 | 40 |
| L2/TW (%) | 22 | 22 | 22 | 15 | 30 |
| Crown sub groove width W7 (mm) | 3 | 3 | 3 | 3 | 3 |
| Crown sub groove depth D3 (mm) | 2 | 2 | 2 | 2 | 2 |
| Crown sub groove distance L4 (mm) | 7 | 7 | 7 | 7 | 7 |
| L4/TW (%) | 5 | 5 | 5 | 5 | 5 |
| Crown narrow groove width W8 (mm) | 1 | 1 | 1 | 1 | 1 |
| Crown narrow groove depth D2 (mm) | 3 | 3 | 3 | 3 | 3 |
| Crown narrow groove distance L5 (mm) | 20 | 20 | 20 | 20 | 20 |
| L5/TW (%) | 15 | 15 | 15 | 15 | 15 |
| Outboard crown lateral groove width W9 (mm) | 3 | 3 | 3 | 3 | 3 |
| Depth D4 gradually decreased ? | yes | yes | yes | yes | yes |
| Range of groove depth D4 (mm) | 3 to 7 | 3 to 7 | 3 to 7 | 3 to 7 | 3 to 7 |
| Outboard crown lateral groove angle α1(deg.) | 60 | 60 | 60 | 60 | 60 |
| Central crown block width W1 (mm) | 10 | 10 | 10 | 10 | 10 |
| W1/TW (%) | 7 | 7 | 7 | 7 | 7 |
| Central crown block length L7 (mm) | 20 to 35 | 20 to 35 | 20 to 35 | 20 to 35 | 20 to 35 |
| L7/W1 (%) | 200 to 350 | 200 to 350 | 200 to 350 | 200 to 350 | 200 to 350 |
| Outboard crown block width W2 (mm) | 9 | 9 | 9 | 9 | 9 |
| W2/TW (%) | 7 | 7 | 7 | 7 | 7 |
| Outboard crown block length L8 (mm) | 25 to 40 | 25 to 40 | 25 to 40 | 25 to 40 | 25 to 40 |
| L8/W2 (%) | 278 to 444 | 278 to 444 | 278 to 444 | 278 to 444 | 278 to 444 |
| Crown narrow rib width W3 (mm) | 5 | 5 | 5 | 5 | 5 |
| W3/TW (%) | 4 | 4 | 4 | 4 | 4 |
| Dry steering stability | 3 | 3 | 1.5 | 2 | 2 |
| Ice/snow performance | 2 | 3 | 3 | 2 | 2 |
| Rolling resistance | 3 | 3 | 3 | 3 | 3 |
| Drainage performance | 2 | 2 | 3 | 2 | 2 |

| | Tire | | | |
|---|---|---|---|---|
| | Ex. 11 | Ex. 12 | Ex. 13 | Ex. 14 |
| Tread pattern | FIG. 2 | FIG. 2 | FIG. 2 | FIG. 2 |
| Cap tread rubber hardness (deg.) | 65 | 65 | 65 | 65 |
| Cap tread rubber loss tangent | 0.1 | 0.1 | 0.1 | 0.1 |
| Middle main groove width W4 (mm) | 4 | 4 | 4 | 4 |
| Middle main groove distance L1 (mm) | 5 | 5 | 5 | 5 |
| L1/TW (%) | 4 | 4 | 4 | 4 |
| Outboard main groove width W5 (mm) | 10 | 10 | 10 | 10 |
| Outboard main groove depth D1 (mm) | 8 | 8 | 8 | 8 |
| Outboard main groove distance L2 (mm) | 30 | 30 | 30 | 30 |
| L2/TW (%) | 22 | 22 | 22 | 22 |
| Crown sub groove width W7 (mm) | 3 | 3 | 3 | 3 |
| Crown sub groove depth D3 (mm) | 3 | 2 | 2 | 2 |
| Crown sub groove distance L4 (mm) | 7 | 7 | 7 | 7 |
| L4/TW (%) | 5 | 5 | 5 | 5 |
| Crown narrow groove width W8 (mm) | 1 | 1 | 1 | 1 |
| Crown narrow groove depth D2 (mm) | 1 | 3 | 3 | 3 |
| Crown narrow groove distance L5 (mm) | 20 | 20 | 20 | 20 |
| L5/TW (%) | 15 | 15 | 15 | 15 |
| Outboard crown lateral groove width W9 (mm) | 3 | 3 | 3 | 3 |
| Depth D4 gradually decreased ? | yes | no | yes | yes |
| Range of groove depth D4 (mm) | 3 to 7 | 3 to 7 | 3 to 7 | 3 to 7 |
| Outboard crown lateral groove angle α1(deg.) | 60 | 60 | 35 | 70 |
| Central crown block width W1 (mm) | 10 | 10 | 10 | 10 |
| W1/TW (%) | 7 | 7 | 7 | 7 |
| Central crown block length L7 (mm) | 20 to 35 | 20 to 35 | 20 to 35 | 20 to 35 |
| L7/W1 (%) | 200 to 350 | 200 to 350 | 200 to 350 | 200 to 350 |
| Outboard crown block width W2 (mm) | 9 | 9 | 9 | 9 |
| W2/TW (%) | 7 | 7 | 7 | 7 |
| Outboard crown block length L8 (mm) | 25 to 40 | 25 to 40 | 25 to 40 | 25 to 40 |
| L8/W2 (%) | 278 to 444 | 278 to 444 | 278 to 444 | 278 to 444 |
| Crown narrow rib width W3 (mm) | 5 | 5 | 5 | 5 |
| W3/TW (%) | 4 | 4 | 4 | 4 |

TABLE 1-continued

| Dry steering stability | 2 | 1.5 | 2 | 2 |
| Ice/snow performance | 2 | 3 | 3 | 2 |
| Rolling resistance | 3 | 3 | 3 | 3 |
| Drainage performance | 2 | 3 | 2 | 3 |

From the test results it was confirmed that Embodiment tires according to the present invention can be improved in the ice/snow performance, while maintaining the steering stability on dry roads.

The invention claimed is:

1. A pneumatic tire comprising:
a tread portion provided with a tread pattern of left-right asymmetry and having an outboard tread edge and an inboard tread edge,
a cap tread rubber having a hardness of from 60 to 75% degrees and disposed in the tread portion to define the tread surface of the tire,
said tread pattern comprising a plurality of circumferentially continuously extending main grooves including
a middle main groove whose widthwise center line is located on the inboard tread edge side of the tire equator at a distance of from 2 to 10% of a tread width from the tire equator, and whose groove width is in a range of from 2 to 6 mm, and
an outboard main groove whose widthwise center line is located on the outboard tread edge side of the tire equator at a distance of from 15 to 30% of the tread width from the tire equator, and whose groove width is more than that of the middle main groove,
wherein
an outboard crown land zone defined between the middle main groove and the outboard main groove is provided with
a crown sub groove extending continuously in the tire circumferential direction, positioned on the outboard tread edge side of the tire equator, and having a groove width less than that of the middle main groove,
a crown narrow groove extending continuously in the tire circumferential direction, positioned on the outboard tread edge side of the crown sub groove, and having a groove width less than that of the crown sub groove, and
a plurality of outboard crown lateral grooves extending from the crown narrow groove to the middle main groove, while inclining to one circumferential direction,
whereby in the outboard crown land zone, there are
a row of circumferentially arranged central crown blocks defined by the middle main groove, the crown sub groove and the outboard crown lateral grooves, and having an axial width W1,
a row of circumferentially arranged outboard crown blocks defined by the crown sub groove, the crown narrow groove and the outboard crown lateral grooves, and having an axial width W2, and
a circumferentially continuously extending crown narrow rib defined between the crown narrow groove and the outboard main groove, and having an axial width W3,
wherein
the axial width W2 is equal to or less than the axial width W1, and equal to or more than the axial width W3, and
the outboard main groove has a groove depth D1, the crown narrow groove has a groove depth D2, and the crown sub groove has a groove depth D3, and the groove depth D2 is less than the groove depth D1 and more than the groove depth D3.

2. The pneumatic tire according to claim 1, wherein the outboard crown lateral grooves each have a groove depth gradually decreasing from the middle main groove to the crown narrow groove.

3. The pneumatic tire according to claim 1, wherein the angle of the outboard crown lateral groove with respect to the tire circumferential direction is in a range of from 30 to 70 degrees.

4. The pneumatic tire according to claim 2, wherein the central crown blocks, the outboard crown blocks and the crown narrow rib are provided with sipes inclined oppositely to the outboard crown lateral grooves.

5. The pneumatic tire according to claim 2, wherein the cap tread rubber has a loss tangent in a range of from 0.05 to 0.15.

6. A pneumatic tire comprising:
a tread portion provided with a tread pattern of left-right asymmetry and having an outboard tread edge and an inboard tread edge,
a cap tread rubber having a hardness of from 60 to 75 degrees and disposed in the tread portion to define the tread surface of the tire,
said tread pattern comprising a plurality of circumferentially continuously extending main grooves including
a middle main groove whose widthwise center line is located on the inboard tread edge side of the tire equator at a distance of from 2 to 10% of a tread width from the tire equator, and whose groove width is in a range of from 2 to 6 mm, and
an outboard main groove whose widthwise center line is located on the outboard tread edge side of the tire equator at a distance of from 15 to 30% of the tread width from the tire equator, and whose groove width is more than that of the middle main groove,
wherein
an outboard crown land zone defined between the middle main groove and the outboard main groove is provided with
a crown sub groove extending continuously in the tire circumferential direction, positioned on the outboard tread edge side of the tire equator, and having a groove width less than that of the middle main groove,
a crown narrow groove extending continuously in the tire circumferential direction, positioned on the outboard tread edge side of the crown sub groove, and having a groove width less than that of the crown sub groove, and
a plurality of outboard crown lateral grooves extending from the crown narrow groove to the middle main groove, while inclining to one circumferential direction,
whereby in the outboard crown land zone, there are
a row of circumferentially arranged central crown blocks defined by the middle main groove, the crown sub groove and the outboard crown lateral grooves, and having an axial width W1, a row of circumferentially arranged outboard crown blocks defined by the crown sub groove, the crown narrow groove and the outboard crown lateral grooves, and having an axial width W2, and a circumferentially continuously extending crown narrow rib defined between the crown narrow groove and the outboard main groove, and having an axial width W3, wherein the axial width W2 is equal to or less than the axial width W1, and equal to or more than the axial width W3, and the outboard crown lateral grooves each have a groove depth gradually decreasing from the middle main groove to the crown narrow groove.

7. The pneumatic tire according to claim 3, wherein the angle of the outboard crown lateral groove with respect to the tire circumferential direction is in a range of from 30 to 70 degrees.

8. The pneumatic tire according to claim 3, wherein the central crown blocks, the outboard crown blocks and the crown narrow rib are provided with sipes inclined oppositely to the outboard crown lateral grooves.

9. The pneumatic tire according to claim 3, wherein the cap tread rubber has a loss tangent in a range of from 0.05 to 0.15.

* * * * *